United States Patent Office 3,775,323
Patented Nov. 27, 1973

3,775,323
COMPOSITIONS WITH A SIMULTANEOUS LUBRICATING AND PHOSPHATISING ACTION FOR THE SURFACE TREATMENT OF STEELS FOR THE PURPOSE OF COLD FORMING OPERATIONS, AND PREPARATION AND USE OF SUCH COMPOSITIONS
Jean Dubourg, Sotteville-les-Rouen, France, assignor to Rhone-Poulenc S.A., Paris, France
No Drawing. Filed Jan. 20, 1972, Ser. No. 219,528
Int. Cl. C10m 1/32, 1/44
U.S. Cl. 252—49.5                12 Claims

ABSTRACT OF THE DISCLOSURE

A lubricating and phosphatising composition, of pH less than 2 and which is liquid at temperatures below 80° C., contains by weight (a) 30–70% of a phosphate of an amide derived from a $C_{14}$–$C_{24}$ unsaturated fatty acid and an amine $H(NHCH_2CH_2)_nNH_2$ where $n=2$–6, (b) 15–55% of a hydrocarbon, non-drying glyceride or ester of a $C_{14}$–$C_{18}$ fatty acid and an alkanol of less than 10 carbons, (c) 3–10% water, (d) 2–7% free phosphoric acid, (e) 8–15% hexylene glycol or a phosphate of methylformamide, dimethylformamide or dimethylacetamide and optionally (f) up to 5% of a surfactant. The composition is prepared by first forming component (a), mixing it with components (b), (e) and (f) and finally incorporating components (c) and (d).

The invention relates to compositions having a simultaneous lubricating and phosphatising action, which can be used for the surface treatment of metals, particularly steel, prior to cold forming operations. The invention also relates to a process for the preparation of such compositions and to their use in such cold forming operations.

The invention is of particular value in treating tubes and strips intended to be drawn, in wiredrawing operations, in cold stamping operations and to provide better wear characteristics for components which will rub against one another.

The compositions according to the invention are of value in the sense that they make it possible, by a single immersion of the components to be treated into a single bath, to obtain a surface layer of metal phosphates which retains a certain amount of lubricant, which facilitates subsequent cold forming operations. Treatments which simultaneously achieve phosphatising and lubrication in a single step are already known but nevertheless the present invention makes it possible to simultaneously achieve a quality of phosphatising and lubrication such that the usual shaping operations are very greatly facilitated.

Furthermore, the rate of overall working can be substantially speeded up, firstly because of the brevity of the treatment compared to those used hitherto and secondly, because a single lubricating and phosphatising treatment suffices for several successive cold forming operations.

Compositions which essentially contain (a) a hydrophilic organic compound possessing a continuous chain of 12 to 30 carbon atoms;
(b) up to 90% by weight of a non-volatile organic lubricant for metals;
(c) from 1 to 15% by weight of water; and
(d) from 2.5 to 25% by weight of phosphoric or phosphorous acid;

have already been proposed for the surface treatment of metals prior to cold forming operations. These compositions should form a single liquid phase which is stable at 80° C. and below. However, experience shows that the majority of these compositions cannot be used industrially. Certain of the compositions are not liquid when cold, other separate into two phases, some prove corrosive and others do not have an effective phosphatising action. Some compositions of this type, whilst effective for several days, become unusable less than one month after they are produced.

No composition previously proposed for the lubrication and phosphatisation of metals prior to cold working, meets the practical requirement of remaining liquid and homogeneous when exposed to air between 25 and 70° C. for at least 30 days whilst retaining an apparent pH below 2 and an Engler viscosity of 2.5 to 15 at 60° C.

A small group of compositions has now been found which can genuinely be used under industrial conditions and which in particular meet the requirements listed above.

The compositions according to the present invention contain as the hydrophilic organic compound containing a chain of more than 12 to 30 carbon atoms, a phosphate of an amide derived from at least one unsaturated fatty acid with 14–24 carbon atoms and at least one polyalkylene polyamine of formula $$H(NH-CH_2-CH_2)_n-NH_2,$$

in which $n$ is an integer of 2 to 6.

More specifically, the compositions according to the invention contain, by weight:

(a) 30 to 70% of a phosphate of an amide derived from at least one unsaturated fatty acid with 14–24 carbon atoms and at least one polyalkylene polyamine of formula $H(NH-CH_2-CH_2)_n-NH_2$ where $n$ is an integer of 2 to 6;

(b) 15 to 55% of at least one lubricant diluent selected from hydrocarbons, non-drying glycerides and esters derived from fatty acids having 14–18 carbon atoms and alkanols with less than 10 carbon atoms;

(c) 3 to 10% of water;

(d) 2 to 7% of free phosphoric acid, the apparent pH of the composition being less than 2;

(e) 8 to 15% of at least one solvent selected from hexyleneglycol and the phosphates of methylformamide, dimethylformamide and dimethylacetamide; and (f) 0 to 5% of a surface-active agent which is stable at a pH below 2.

The apparent pH of this composition is its pH as indicated on pH indicator paper when immersed in the composition and should be less than 2.

Component (a) may be a phosphate of an amide derived from a carboxylic acid where the carboxylic group is bonded to an ethylenically unsaturated hydrocarbon radical, that is to say an alkenoic acid, such as oleic acid or the fatty acids of colza oil, and a polyalkylene polyamine such as tetraethylenepentamine, triethylenetetramine or diethylenetriamine.

Component (b) may be a mineral oil, a glyceride such as colza oil, castor oil, lard oil, spermaceti oil, neat's-foot oil, or an alkyl ester of a $C_{14}$–$C_{18}$ alkanoic acid such as ethyl oleate or isopropyl oleate or ethylhexyl stearate.

Component (f) may be a condensation product of ethylene oxide with a long-chain alkylamine, for example the polyoxyethylated tallow amines, or one of the known non-ionic surface-active agents.

The phosphoric acid used in the composition and the phosphoric acid from which the phosphate amide is derived is of course orthophosphoric acid $H_3PO_4$.

It is important in the production of the compositions of the present invention that the phosphate amide be prepared and mixed with components (b) and (e) and with component (f), if used, before the free phosphoric acid and water are incorporated into the mixture. One should avoid the production of the phosphate amide in situ by incorporating the amide in a mixture containing an excess of phosphoric acid, part of which reacts with the amide to form the phosphate amide and the remainder of which provides the required free phosphoric acid.

Consequently, it is preferred to utilise the following steps in the production of the compositions:

(1) Stoichiometric amounts of the acid and polyalkylenepolyamine are mixed together and heated (e.g. to about 155–160° C., whilst stirring, for about 3 hours when oleic acid is used) to form the amide.

(2) The mixture obtained is cooled (e.g. to 80–130° C., preferably to about 120° C., for an oleamide) and thereafter the exact amount of phosphoric acid required to produce the amide phosphate is added, and the mixture stirred for 15 to 30 minutes at this temperature. Account should be taken of the fact that the acid generally used is phosphoric acid containing from 100 to 75% by weight of $H_3PO_4$ and ⅓ mole $H_3PO_4$ is required per protonable amide group in the amide molecule.

(3) The amide phosphate so obtained is stirred and the lubricant diluent (e.g. colza oil, neat's-foot oil, lard oil, castor oil, isopropyl oleate or spindle oil), solvent, and the surface-active agent if used, are added.

(4) This mixture is then cooled to between 100 and 40° C., preferably to about 60° C., and whilst continuing vigorous stirring, the required amounts of water and phosphoric acid are gradually added. Stirring is continued for 30 to 60 minutes after the end of the addition so as to achieve complete homogenisation.

A certain number of examples of compositions according to the invention will be described below. To determine the phosphatising power, phosphatising tests (20 minutes at 65°). are carried out on samples of steel sheet of 1 dm.² surface area which have been carefully stripped, rinsed with water and then with acetone, and weighed. Experience has shown that a phosphatisation deposit of between 20 and 150 mg./dm.² is necessary, provided the phosphatising is uniform and adheres. A deposit of between 30 and 60 mg./dm.² is generally considered satisfactory.

In the various examples which follow the degree of phosphatising achieved at 65° C. is indicated in the table opposite each of the compositions.

EXAMPLE 1

(a) Preparation of the amide 1,120 g. (4 mols) of oleic acid are heated to about 80° C. in a 2 litre beaker equipped with a spiral stirrer at the bottom. 146 g. (1 mol) of triethylenetetramine are then added and the temperature of the mixture is raised to 150° over the course of 1 hour, whilst stirring. Heating and stirring is continued for 3 hours at 150–160° C. and the mixture is then cooled to about 110–120° C.

(b) Preparation of the amide phosphate 175 g. of 75% phosphoric acid (1⅓ mols) are carefully added over the course of 1½ hours to the amide prepared in (a) above. This addition is carried out at between 100 and 130° C. so that all the water introduced with the phosphoric acid is eliminated. The mixture is stirred for a further 30 minutes after the end of the addition whilst keeping the temperature at 120–130° C., so as to completely eliminate the water. 1,320 g. of amide phosphate are obtained.

(c) Preparation of the phosphatising lubricant 450 g. of the amide phosphate prepared in (b) above are introduced into a 2 litre beaker equipped with a spiral stirrer at the bottom, and when the temperature of the amide has been brought to between 60 and 80° C., 200 g. of isopropyl oleate, 160 g. of bacon oil, and 80 g. of hexyleneglycol are added; thereafter, whilst returning the temperature to about 55 to 65° C., 50 g. of 75% strength phosphoric acid and 60 g. of water are added and the stirring is continued for a further 30 minutes at between 55 and 65° C.

The composition prepared in Example 1(c) is summarised under Example 1 of the table below and its Engler viscosity and phosphatising power indicated. Example 1 was repeated using other proportions and other ingredients as components (a), (b), (e) and (f) and the nature of these proportions and ingredients are summarised in the table below under Examples 2–9 which also indicates the Engler viscosity and phosphatising power of the compositions.

| Ingredients (percent by weight) | | 1 | 2 | 3 | 4 | 5 | 6 | 7 | 8 | 9 |
|---|---|---|---|---|---|---|---|---|---|---|
| Composition: | | | | | | | | | | |
| a | Phosphate of the amide of oleic acid with— | | | | | | | | | |
| | Diethylenetriamine | | | 40 | 60 | 30 | 60 | 30 | 40 | 48 |
| | Triethylenetetramine | 45 | 35 | | | | | | | |
| b | Mineral oil (spindle oil): | | | | | | | | | |
| | Density at 20° C.: 0.865 | | | | 20 | | 54 | 15 | | |
| | Engler viscosity at 50° C.: 2.4 | | | | | | | | | |
| | Neat's-foot oil | | | | 12 | | | | | |
| | Lard oil | 16 | | | | | | | | |
| | Castor oil | | | 8 | | | | | | |
| | Isopropyl oleate | 20 | 37 | | 14 | | | 52.6 | 30.7 | 22.7 |
| c | Water | 6 | 6 | 6 | 5 | 4 | 8 | 3.4 | 8.3 | 8.3 |
| d | Free phosphoric acid (100% strength) | 5 | 5 | 6 | 5 | 2 | 7 | 2 | 7 | 7 |
| e | Hexylene glycol | 8 | 3 | | 8 | 10 | 10 | | | |
| | Dimethylformamide phosphate | | 10 | 12 | | | | 10 | 10 | 10 |
| f | Polyoxyethyleneated tallow amine | | 4 | 4 | | | | 2 | 4 | 4 |
| Engler viscosity at 60° C | | 5.9 | 6.3 | 11.8 | 11.4 | 2.84 | 14.0 | 2.6 | 6.1 | 14 |
| Phosphatising test at 65° C. (mg./dm.²) | | +40 | +44 | +35 | +43 | +31 | +24.5 | +31.5 | +47 | +45 |

Finally, some examples of using the compositions described above are given below:

EXAMPLE A.—DRAWING TUBES IN A SINGLE PASS, WITH HIGH ELONGATION

Mild steel blanks, previously stripped in a sulphuric acid bath, rinsed and treated for 20 minutes in one of the compositions described in Examples 4 and 8 at a temperature of 66/68° C. and drained, were reduced in a single pass from 37 mm. external diameter and 4 mm. thickness to 25.4 mm. external diameter and only 3 mm. thickness, at the rate of 40 metres/minute, representing an elongation of very close to 100%. The external appearance of the drawn tubes is very clean and rather glossy.

EXAMPLE B.—Drawing tubes in 4 successive passes

Tubes prepared from mild steel blanks stripped, rinsed and treated for 25 minutes in the composition of Example 1, kept at 65° C. The 68 x 3 mm. blanks are reduced to 45 x 1.25 mm. in 4 successive passes without re-immersion, passing through the following intermediate stages: 60 x 2.5 mm., 55 x 2 mm. and 50 x 1.5 mm. Drawing is carried out on a fixed mandrel at the rate of 14 meters/minute.

EXAMPLE C

Tubes prepared as above from blanks of 25 mm. external diameter and 2.2 mm. thickness, are reduced to 9.53 mm. external diameter and 0.86 mm. thickness in 4 successive reductions, with a total elongation of 540%, at the rate of 30 metres/minute on a floating mandrel.

In both Examples B and C, the tubes obtained are free of streaks and very glossy.

I claim:
1. An improved lubricating and phosphatising composition for the surface treatment of steel prior to cold forming operations, the said composition remaining liquid and homogeneous when exposed to air between 25 and 70° C. for at least 30 days while retaining a pH, as indicated on pH indicator paper, below 2 and an Engler viscosity at 60° C. of 2.5 to 15, said composition containing, by weight:
(a) 30 to 70% of at least one preformed phosphoric acid salt of an amide derived from at least one ethylenically unsaturated fatty acid having 14–24 carbon atoms and at least one amine of formula

$$H(NH-CH_2-CH_2)_nNH_2$$

in which $n$ is an integer of 2 to 6;
(b) 15 to 55% of at least one lubricant diluent selected from hydrocarbons, non-drying glycerides and esters derived from fatty acids having 14–18 carbon atoms and alkanols with less than 10 carbon atoms;
(c) 3 to 10% of water;
(d) 2 to 7% of free phosphoric acid;
(e) 8 to 15% of at least one solvent selected from hexyleneglycol and the phosphates of methylformamide, dimethylformamide and dimethylacetamide; and
(f) 0 to 5% of a surface-active agent which is stable at a pH below 2.

2. A composition according to claim 1 wherein component (a) is the reaction product of phosphoric acid and an amide derived from oleic acid or a colza oil fatty acid and tetraethylenepentamine, triethylenetetramine or diethylene triamine.

3. A composition according to claim 1 wherein component (b) is a mineral oil, colza oil, neat's-foot oil, lard oil, castor oil, spermaceti oil, ethyloleate, ethylhexyl stearate or isopropyl oleate.

4. A composition according to claim 3 consisting essentially of 22–54% component (b), 30–60% of the phosphate of the amide derived from oleic acid and diethylenetriamine or triethylenetetramine, 3–9% water, 2–7% free orthophosphoric acid, 8–13% of hexylene-glycol or the phosphate of dimethylformamide or a mixture thereof and 2–4% of an ethylene oxide/tallow amine adduct.

5. A process for lubricating and phosphtising a metal component which comprises bringing the component and a composition according to claim 1 into contact with one another at 50–70° C., and subsequently subjecting the component to a cold forming operation.

6. A process for lubricating and phosphatising a metal component which comprises bringing the component and a composition according to claim 2 into contact with one another at 50–70° C., and subsequently subjecting the component to a cold forming operation.

7. A process for lubricating and phosphatising a metal component which comprises bringing the component and a composition according to claim 3 into contact with one another at 50–70° C., and subsequently subjecting the component to a cold forming operation.

8. A process for lubricating and phosphatising a metal component which comprises bringing the component and a composition according to claim 4 into contact with one another at 50–70° C., and subsequently subjecting the component to a cold forming operation.

9. A process for the preparation of an improved lubricating and phosphatising composition for the surface treatment of steel prior to cold forming operations, the said composition remaining liquid and homogeneous when exposed to air at between 25 and 70° C. for at least 30 days whilst retaining a pH, as indicated on pH indicator paper, below 2 and an Engler viscosity at 60° C. of 2.5 to 15, said process comprising:
(1) reacting phosphoric acid with an amide derived from at least one ethylenically unsaturated fatty acid having 14–24 carbon atoms and at least one amine of formula $H(NH-CH_2-CH_2)_nNH_2$, $n$ being an integer from 2–6, in a proportion of ⅓ mole of phosphoric acid for each protonable amide group in the amide molecule, until the phosphoric acid salt of the amide is formed;
(2) mixing the phosphoric acid salt of the amide with at least one lubricant diluent selected from hydrocarbons, non-drying glycerides and esters derived from fatty acids having 14–18 carbon atoms and alkanols with less than 10 carbon atoms, at least one solvent selected from hexyleneglycol and the phosphates of methylformamide, dimethylformamide and dimethylacetamide, and if desired, a surface active agen which is stable at a pH below 2; and
(3) incorporating in the resulting mixture, water and phosphoric acid, the proportions being such that the composition contains by weight, 30–70% phosphoric acid salt of the amide, 15–55% lubricant diluent, 3–10% water, 2–7% free phosphoric acid, 8–15% solvent and 0–5% surface active agent.

10. A process according to claim 9 wherein the amide is derived from oleic acid or a colza oil fatty acid and tetraethylenepentamine, triethylenetetramine or diethylenetriamine.

11. A process according to claim 9 wherein the lubricant diluent is a mineral oil, colza oil, neat's-foot oil, lard oil, castor oil, spermaceti oil, ethyloleate, ethylhexyl stearate or isopropyl oleate.

12. A process according to claim 11 wherein the proportions and components are such that the composition consists essentially of 22–54% lubricant diluent, 30–60% of the phosphate of the amide derived from oleic acid and diethylenetriamine or triethylenetetramine, 3–9% water, 2–7% free phosphoric acid, 8–13% of hexyleneglycol or the phosphate of dimethylformamide or a mixture thereof and 2–4% of an ethylene oxide/tallow amine adduct.

References Cited
UNITED STATES PATENTS 2,935,432  5/1960  Schuster et al. ____ 148—6.15 R
2,739,915  3/1956  Schuster et al. ____ 148—6.15 Z
2,886,477  5/1959  Smith _____ 148—6.15 R
2,403,293  7/1946  Miskel _____ 148—6.15 R
2,992,145  7/1961  Santangelo et al. __ 148—6.15 R

OTHER REFERENCES

Schonfeldt: "Surface Active Ethylene Oxide Adducts" (1969), p. 211.

DANIEL E. WYMAN, Primary Examiner
W. H. CANNON, Assistant Examiner

U.S. Cl. X.R.

72—42; 117—134; 148—6.15 R; 252—32.5, 49.3, 49.9